United States Patent
Steinberger et al.

(10) Patent No.: US 9,531,146 B2
(45) Date of Patent: Dec. 27, 2016

(54) BUSBAR ADAPTER AND SYSTEM CONSISTING OF BUSBARS AND A BUSBAR ADAPTER

(71) Applicant: WOEHNER GMBH & CO. KG ELEKTROTECHNISCHE SYSTEME, Roedental (DE)

(72) Inventors: Philipp Steinberger, Roedental (DE); Joram Masel, Kronach (DE); Hubert Lenker, Sonneberg (DE)

(73) Assignee: WOEHNER GMBH & CO. KG ELEKTROTECHNISCHE SYSTEME, Roedental (DE)

( * ) Notice: Subject to any disclaimer, the term of this patent is extended or adjusted under 35 U.S.C. 154(b) by 0 days.

(21) Appl. No.: 14/626,180

(22) Filed: Feb. 19, 2015

(65) Prior Publication Data

US 2015/0244123 A1   Aug. 27, 2015

(30) Foreign Application Priority Data

Feb. 21, 2014   (EP) .................................. 14156075

(51) Int. Cl.
| H01R 13/64 | (2006.01) |
| H01R 25/14 | (2006.01) |
| H02B 1/21 | (2006.01) |

(52) U.S. Cl.
CPC .......... *H01R 25/142* (2013.01); *H01R 25/145* (2013.01); *H02B 1/21* (2013.01)

(58) Field of Classification Search
CPC .... H01R 13/631; H01R 25/145; H01R 31/085
USPC .................................. 439/251, 949; 361/637
See application file for complete search history.

(56) References Cited

U.S. PATENT DOCUMENTS

| 4,646,199 A * | 2/1987 | M'Sadoques .......... H02B 1/056 361/634 |
| 6,164,988 A * | 12/2000 | Wagener .................. H02B 1/20 439/110 |
| 7,448,885 B2 * | 11/2008 | Wagener .................. H02B 1/21 439/116 |
| 7,601,013 B2 * | 10/2009 | Wagener .................. H02B 1/21 439/110 |

(Continued)

FOREIGN PATENT DOCUMENTS

| CN | 2461185 Y | 11/2001 |
| CN | 101908721 | 12/2010 |

(Continued)

OTHER PUBLICATIONS

European Patent Office; Extended European Search Report for Application No. 14156075.5 dated Jun. 30, 2014.

*Primary Examiner* — Abdullah Riyami
*Assistant Examiner* — Thang Nguyen
(74) *Attorney, Agent, or Firm* — Steven B. Phillips; Moore & Van Allen PLLC (57) ABSTRACT

Busbar adapter comprising a lower adapter part, the lower adapter part comprising a base having recesses for receiving connection bars which can be electrically contacted with busbars, the number of connection bars per phase which can be received in the recesses of the lower adapter part being variable, and the connection bars being electrically connectable to at least one electrical device, which can be fastened to an upper adapter part of the busbar adapter.

18 Claims, 10 Drawing Sheets

(56) References Cited

U.S. PATENT DOCUMENTS

| | | | |
|---|---|---|---|
| 7,867,000 B1* | 1/2011 | Andreas-Schott | H01M 8/0247 439/251 |
| 7,896,711 B2* | 3/2011 | De Carolis | H01R 9/2408 439/717 |
| 8,093,984 B2* | 1/2012 | Hofmann | H01H 71/1081 218/151 |
| 8,714,991 B2* | 5/2014 | Kayma | H02B 1/21 361/636 |
| 9,106,033 B2* | 8/2015 | Buettner | H01R 25/145 |
| 2006/0035517 A1* | 2/2006 | Wagener | H02G 3/105 439/532 |
| 2008/0220635 A1 | 9/2008 | Wagener et al. | |
| 2010/0233893 A1* | 9/2010 | Buettner | H01H 31/122 439/121 |
| 2013/0280930 A1* | 10/2013 | Buettner | H01R 25/145 439/110 |
| 2014/0198475 A1* | 7/2014 | Menzies | H01R 13/08 361/811 |

FOREIGN PATENT DOCUMENTS

| | | |
|---|---|---|
| DE | 29716201 U1 | 1/1999 |
| DE | 202004019766 U1 | 4/2005 |
| EP | 1045497 A2 | 10/2000 |

* cited by examiner

BUSBAR ADAPTER AND SYSTEM CONSISTING OF BUSBARS AND A BUSBAR ADAPTER

CROSS-REFERENCE TO RELATED APPLICATIONS

This application claims the benefit of European Application No 14156075.5, filed in the European Patent Office on Feb. 21, 2014, which is incorporated herein by reference in its entirety.

FIELD OF THE INVENTION

The invention relates to a busbar adapter and to a system consisting of busbars and a busbar adapter.

TECHNICAL BACKGROUND

Universal busbar adapters are known in control system construction for receiving motor starters and the like up to a current load capacity of 630 A.

For larger switching devices and especially in energy distribution systems, DE 20 200 40 19 766 U1 discloses an option for fastening power switches to the 185 mm bar system. A device adapter is provided which comprises a mounting plate which is screwed onto a busbar support. The mounting plate together with the busbar support can be latched onto an existing copper 185 mm busbar system from the front without screws. Further, correspondingly curved connection bars are placed on and fixed to associated busbars. The connection between a load break switch and the copper bars visible at the upper part of the mounting plate can be provided using lamellar copper or copper bars which are prepared and curved in advance.

The device adapter of DE 20 200 40 19 766 U1 is a construction set and is complex to assemble. Incorrect assembly is not completely prevented. Further, only pre-curved copper bars which project out of the upper part of the mounting plate can be used in the device adapter. Moreover, only one connection bar per phase is provided.

An object of the invention is to provide an improved busbar adapter and a system consisting of busbars and a busbar adapter of this type.

SUMMARY OF THE INVENTION

The invention accordingly provides a busbar adapter comprising a lower adapter part, the lower adapter part comprising a base having recesses for receiving connection bars which can be electrically contacted with busbars, the number of connection bars per phase which can be received in the recesses of the lower adapter part being variable, and the connection bars being electrically connectable to at least one electrical device, in particular a switching device, which can be fastened to the upper adapter part of the busbar adapter.

As a result, for each phase a fitting consisting of one or of for example two connection bars can be received in the recesses of the lower adapter part and electrically contacted with a switching device fastened to the upper adapter part. As a result, a wider spectrum of use of the busbar adapter can be provided.

In one possible embodiment of the busbar adapter according to the invention, at least one connection bar per phase is provided. At least one connection bar of a phase can be provided to be connectable to at least one additional connection bar, the connection bars being stacked or stacked on top of one another. As a result of the connection bars being stacked, a compact construction can be achieved.

In a further possible embodiment of the busbar adapter according to the invention, at least two connection bars per phase are provided, the at least two connection bars being arranged side by side and for example mutually parallel. As a result, a more planar construction of the busbar adapter can be achieved.

In one possible embodiment of the busbar adapter according to the invention, the busbar adapter comprises at least one connection device, which is formed so as to combine the currents of a plurality of connection bars for each phase. This makes possible additional simplification of the construction and assembly of the busbar adapter.

In another possible embodiment of the busbar adapter according to the invention, the connection device comprises a connection plate, at least one connection tube and a screw element guided in the connection tube. The at least one screw element is connectable to a connection bar at one end and to the connection plate at the other end, the connection plate being connectable to at least one switching device. In this way, planar or plate-like connection bars can be contacted in a very simple manner within the busbar adapter and there is no need to use pre-curved connection bars of which one end has to be exposed externally for assembly.

In a further possible embodiment of the busbar adapter according to the invention, the upper adapter part comprises at least one opening and for example a plurality of openings for passing a connection device through and for connecting the connection device to an associated connection bar. This makes it possible for the connection device for example to be attached to both ends of a connection bar and thus for greater flexibility to be achieved during connection to a switching device. The connection device merely has to be fastened to the desired end of the connection bar.

In one possible embodiment of the busbar adapter according to the invention, the openings are formed to be coverable using a respective cover. The cover of the respective opening can be provided by a removable lid. Likewise, the cover of the opening may also be formed to be pierceable, for example in the form of a pierceable plastics material plate. Further, the openings may also be formed to be sealable using a tool die or tool dies. The cover has the advantage that it prevents the entry of foreign bodies.

In another possible embodiment of the busbar adapter according to the invention, the upper adapter part is formed symmetrically. For example, one end of the upper adapter part is formed with openings for passing a connection device through. As a result, the upper adapter part can also in a very simple manner be provided rotated through 180° on the lower adapter part, for example if the openings for passing the connection device through are needed on the other end or opposite end.

In one possible embodiment of the busbar adapter according to the invention, at least one recess of the lower adapter part comprises webs as a support face for a connection bar received in the recess. The webs have the advantage that the connection bars are not positioned planar on the adapter base, and therefore counteract excessive heating. Between the webs, the base may further comprise openings which make additional air circulation and cooling possible.

In another possible embodiment of the busbar adapter according to the invention, at least one holding plate comprises at least one or more hole patterns for switching devices, for fastening a switching device. In this way, different switching devices can be fastened to the holding plate without the need to exchange it for another holding plate having an appropriate hole pattern. As a result, the range of uses of the busbar adapter can likewise be increased, and holding plates do not have to be exchanged to fasten different switching devices.

In a further possible embodiment of the busbar adapter according to the invention, a connection bar comprises a contact clamp for sliding onto a busbar and for electrically contacting the connection bar with the busbar. In this way, the busbar adapter can be fastened to the busbar in a very simple manner by sliding it onto said busbar.

In one possible embodiment of the busbar adapter according to the invention, the contact clamp comprises for example a screw having an internal hexagon for clamping the connection bar to the busbar received in the contact clamp. The screw can thus be actuated from the outside through an opening in the upper adapter part without risk of contact. Due to the internal hexagon, a screw without a screw head can be used and in addition space can be saved as a result.

In another possible embodiment of the busbar adapter according to the invention, the busbar adapter comprises at least one current transformer and/or a connecting piece for connecting a further electrical device. The connecting piece comprises for example an opening for passing at least one connection tube of a connection device through. To connect an electrical device, in particular a transformer, such as a current transformer, the connecting piece comprises at least one terminal. The connecting piece can be coupled to the connection device in a very simple manner, and makes it possible to connect for example at least one additional transformer for current measurement. Providing the connecting piece, for example for a current transformer, between the connection plate and the lower adapter part makes a particularly compact construction possible.

In another possible embodiment of the busbar adapter according to the invention, the recesses of the lower adapter part are formed in such a way that connection bars of different lengths can be received therein. As a result, for example short, medium-length and long connection bars can be combined with one another and the range of use of the busbar adapter can be extended.

In one possible embodiment of the system according to the invention, at least one connection bar per phase is received in the recesses of the busbar adapter. The connection bars may be the same or different lengths. Further, the connection bar of at least one phase may be contactable at both ends by a connection device. For this purpose, the connection device merely has to be introduced into the associated opening at the correct end of the upper adapter part and connected to the end positioned underneath of the connection bar. One connection bar per phase is particularly suitable at nominal currents of <800 A.

In another possible embodiment of the system according to the invention, the connection bars are planar or plate-shaped connection bars and in particular copper bars. These connection bars are cost-effective to produce, since they do not require an additional curving process.

In a further possible embodiment of the system according to the invention, at least two connection bars per phase are received in the recesses of the busbar adapter. The connection bars of the different phases are for example or the same or different lengths. Further, the connection bars of at least one phase may be contactable by the connection device at both ends. A plurality of connection bars per phase, for example two, is particularly suitable at nominal currents of >800 A.

BRIEF DESCRIPTION OF FIGURES

In the following, possible embodiments of the multi-pole switching device according to the invention are described in greater detail with reference to the accompanying drawings, in which.

DETAILED DESCRIPTION OF EMBODIMENTS

In the following, further possible embodiments of the busbar adapter according to the invention are described in detail with reference to the accompanying drawings.

Figure 1:
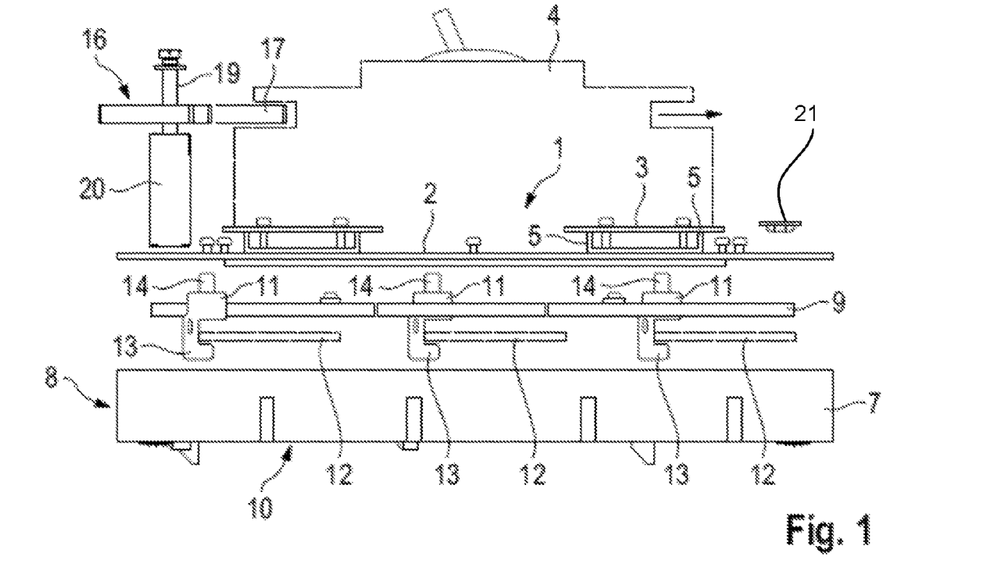
FIG. 1 is an exploded view of a busbar adapter in accordance with an embodiment of the invention.
Figure 2:
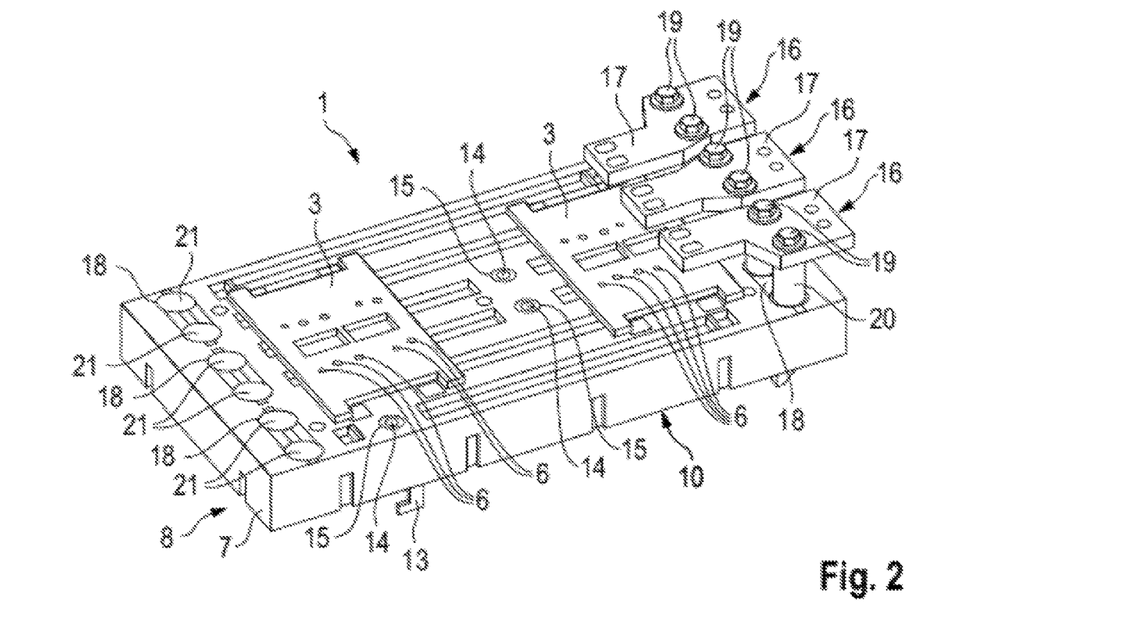
FIG. 2 is a perspective view of the busbar adapter of FIG. 1.

FIG. 1 is an exploded view of a busbar adapter 1, for example a three-phase busbar adapter, in accordance with an embodiment of the invention. FIG. 2 in turn is a perspective view of the assembled busbar adapter 1 of FIG. 1.

In the embodiment shown in FIGS. 1 and 2, the busbar adapter 1 is for example in the form of a three-phase busbar adapter, it also being possible for the busbar adapter 1 according to the invention to comprise one or two or more than three phases. The busbar adapter 1 comprises an upper adapter part 2, on which holding plates 3 are fastened. In this context, the upper adapter part 2 is made for example of plastics material or another material or material combination suitable for the upper adapter part.

The holding plates 3 serve to fasten switching devices 4, for example power switches, as is indicated by a dotted line in FIG. 1. The holding plates 3 are fastened, for example screwed, to the upper side of the upper adapter part 2. In the embodiment shown in FIGS. 1 and 2, the holding plates 3 comprise for example spacer portions 5, by means of which the holding plates 3 are fastened to the upper adapter part 2 at a distance from the upper side thereof. In this way, excessive heating of the upper adapter part 2 can be counteracted. However, the invention is not limited to this special configuration. The holding plates may further also be provided lying on the upper adapter part 2 without spacer portions of this type, depending on the function and the purpose of use.

For fastening electrical devices, in particular switching devices 4, the respective holding plate 3 comprises a fastening hole pattern 6 for one or more switching devices, as is shown in FIG. 2. The fastening hole pattern 6 of the respective holding plate 3 preferably forms a fastening hole pattern 6 for the most common switching devices, for example power switches etc.

The busbar adapter 1 further comprises a housing 7 as the lower adapter part 8, in which planar or plate-shaped connection bars or busbars 9, in particular copper bars, can be received. For this purpose, recesses are provided on a base 10 of the housing 7 for receiving the connection bars 9, as is shown in the following FIG. 3 to 6. The recesses are for example in the form of a depression in the housing base 10, or the housing base 10 is provided as a planar face having projections which form a recess for installing and positioning the respective connection bar 9.

The housing base 10 comprises for example webs as support faces for the connection bars 9. As support faces, the webs have the advantage that they prevent excessive heating of the housing base. Between the webs, the base may further comprise openings, which make additional air circulation and cooling possible.

The respective connection bar 9 is electrically contacted by means of a contact clamp 11.

The lower adapter part 8 or housing 7 is configured in such a way that, at different nominal currents, flexible equipping with connection bars 9 is possible. For each of the three phases L1, L2 and L3 of the three-phase busbar adapter, a fitting of for example up to two connection bars can be inserted into the housing. Thus, for example at nominal currents of <800 A, only one fitting of one connection bar per phase is installed for each phase, as is shown in the following FIGS. 4 and 6. As a result, in this case, only three contact clamps are actually required for electrically contacting the three connection bars, instead of six.

Figure 3:
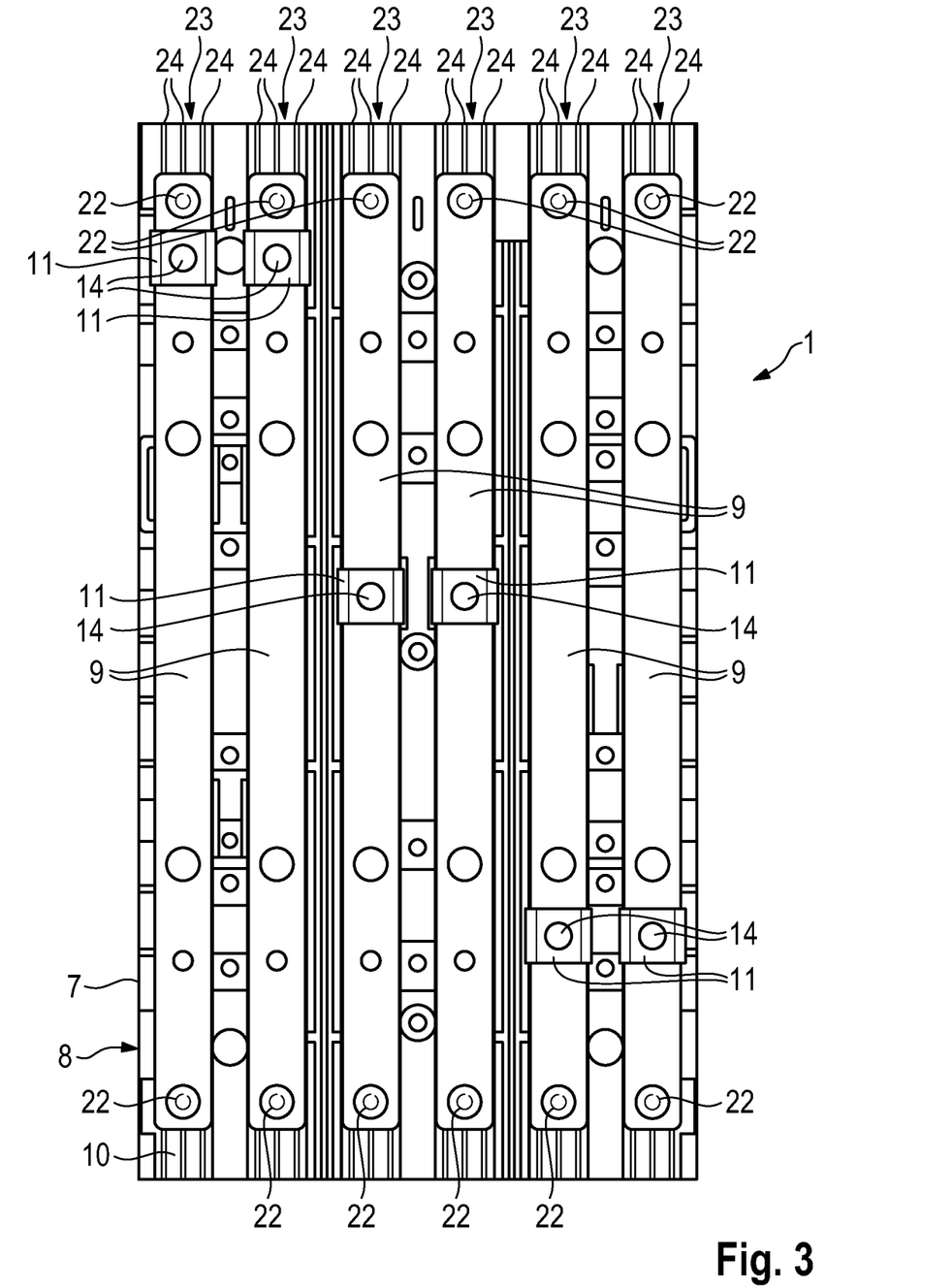
FIG. 3 is a plan view of the housing of the busbar adapter of FIGS. 1 and 2, two long bars being arranged doubly in the housing in each case.
Figure 5:
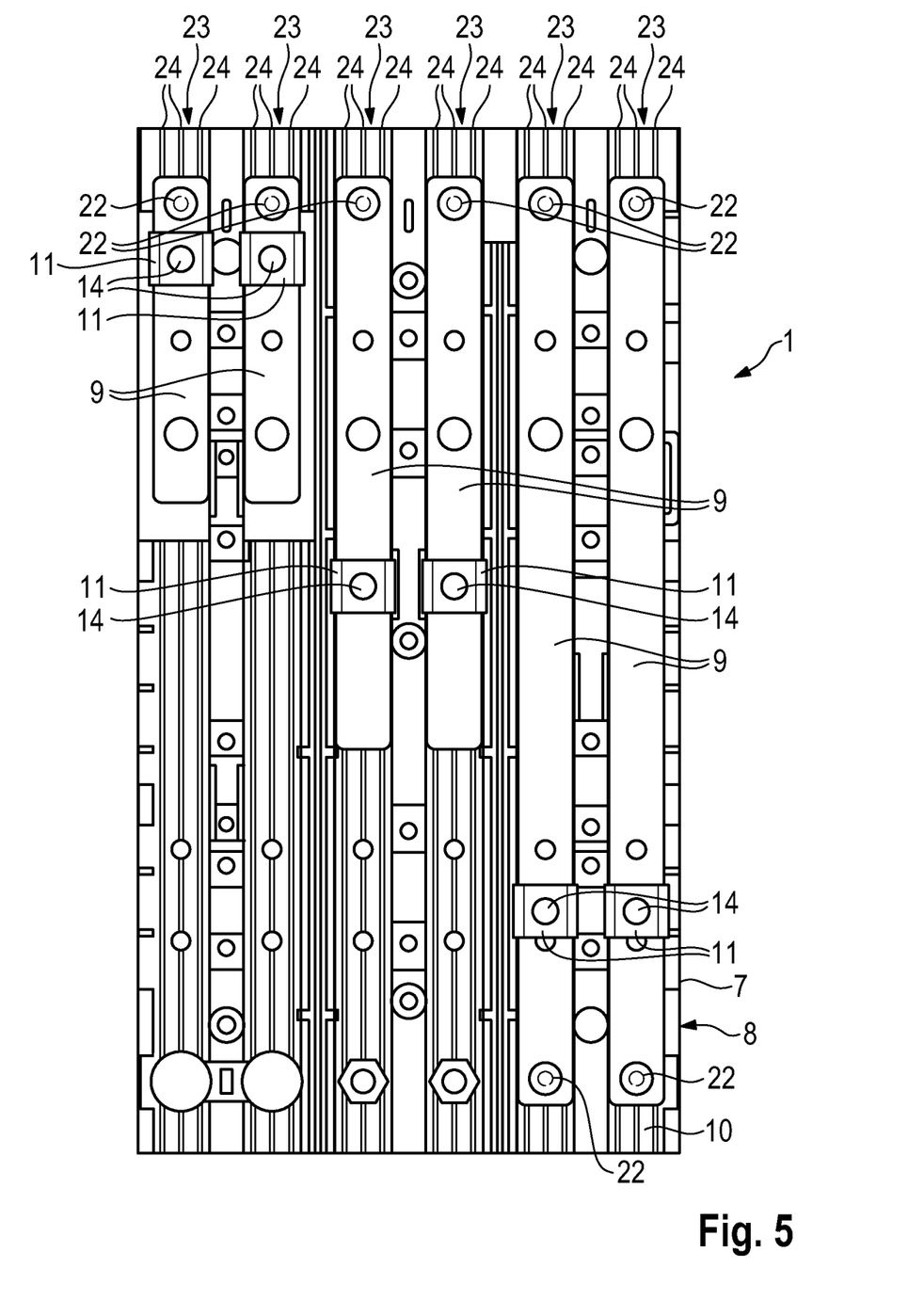
FIG. 5 is a plan view of the housing of the busbar adapter of FIGS. 1 and 2, two short bars being arranged doubly in the housing in each case.

At nominal currents of >800 A, parallel connection bars 9 or parallel bars are installed in the associated recesses of the housing 7, and contacted with two contact clamps each, as is shown in FIG. 1 and the following FIGS. 3 and 5. The parallel bars comprise for example two connection bars 9 for each phase L1, L2 and L3, which are arranged mutually parallel in the housing 7. The fitting of two connection bars 9 for each phase L1, L2 and L3 is inserted into the housing 7 and electrically contacted with two associated contact clamps 11. Accordingly, in this case six contact clamps are used for electrically contacting six connection bars.

The busbar adapter 1 is subsequently placed on associated busbars 12.

The busbars 12 are introduced, as is indicated in the embodiment of FIG. 1 using a dashed line, into corresponding contact recesses 13, for example C-shaped contact recesses, of the contact clamps 11, and clamped in place on the associated connection bar 9 and electrically contacted. In the embodiment shown in FIGS. 1 and 2, the respective contact clamp 11 comprises a screw 14 for this purpose, which is accessible to a user from the outside through the upper adapter part 2 without risk of contact, and can be tightened by the user so as to fasten the busbar 12 and the respectively associated connection bar 9 to one another and electrically contact them. The screw 14 comprises for example an internal hexagon and is accessible to a user from the outside through an associated opening 15 in the upper adapter part 2. The screw 14 is at a sufficient distance from the underside of the upper adapter part 2 that a user cannot unintentionally touch the screw 14 with a finger through the opening 15. However, the invention is not limited to this special configuration of the contact clamp 11 and the screw 14 thereof. Any other contact clamp which is suitable for electrically contacting the busbar 12 and the respectively associated connection bar 9 may be provided. The invention is in particular not limited to a screw having an internal hexagon for connecting and electrically contacting the busbar 12 and the respective connection bar 9.

Using connection devices 16, the currents of the connection bars 9 are passed to a respective switching device 4, which is fastened to the holding plates. As described above, a switching device 4 is indicated by a dotted line in FIG. 1. If for example two connection bars 9 are provided for each phase L1, L2 and 13, the currents of the two connection bars 9 are combined by the connection device 16 and passed to the switching device 4, as is shown in FIG. 2. As is shown in the embodiment of FIGS. 1 and 2, the connection device comprises a connection plate 17 for connecting the connection bar or, as is shown in FIG. 2, two connection bars 9 for each phase L1, L2, 13 to a switching device 4, for example a power switch.

For the connection devices 16, for connection to the respective connection bar 9, openings 18 or through-holes are provided in the upper adapter part 2. The openings 18 are arranged above for example one or both ends of the connection bars 9 received in the lower adapter part 8 or housing 7, in such a way that at least one or preferably both ends of the connection bars 9 can be connected to the associated connection device 16. The connection devices 16 merely have to be inserted into the upper adapter part 2 at the upper or lower end of the connection bars 9 and connected to the end respectively positioned underneath of the connection bar 9.

However, the invention is not limited to connecting the connection device 16 to the ends of the connection bars 9. The connection devices 18 and the associated openings 18 in the upper adapter part 2 may be provided in any other position for contacting the connection device with an associated connection bar. For example, it is also possible for the connection device to contact the respective connection bar in the middle thereof and for the associated opening in the upper adapter part accordingly to be provided above the middle of the connection bar.

The connection device 16 in each case comprises the connection plate 17 for connection to a switching device 4 fastened to the holding plate 3. Further, at least one screw element 19 is fastened to the connection plate 17. The screw element 19 is guided in a connection tube 20 and is fastened, for example screwed, to the associated connection bar 9. For this purpose, the connection tube 20 comprising the screw element 19 is passed through the opening 18 in the upper adapter part 2, and the screw element 19 is screwed into the associated thread of the connection bar 9. As a result, a switching device 4 can be electrically connected to the busbar 12 by means of the connection device 16 and a respective connection bar 9. Further, the currents of two connection bars 9 of a phase L1, L2 or L3 can be combined by means of a shared connection plate 17 of the connection device 16 and passed to the switching device 4, as is shown in the embodiment of FIGS. 1 and 2. The two screw elements 19, which are each guided in an associated connection tube 20, are thus connected, for example screwed, to the shared connection plate 17.

The openings 18 on the side of upper adapter part 2 which are not required, or into which no connection tubes 20 having screw elements 19 are inserted, are sealed for example using covers 21 for the connection tubes 20, in such a way that no current-carrying parts can be touched. The covers 21 may be provided as lids in the openings, which are removed when a connection tube having a screw element 19 is inserted. Likewise, the openings 18 may also be formed with a cover 21 in the form of a pierceable cover, for example a plastics material plate etc. For insertion, the connection tube 20 together with the screw element 19 thereof pierces the cover 21 of the opening 18.

Alternatively, the openings 18 in the upper adapter part 2 may also be sealed on one side using a removable stamp (not shown) in the tool. In a further embodiment (not shown), the upper adapter part 2 may be made symmetrical, in such a way that only one side is provided with the openings or through-holes, and if necessary the upper adapter part may be mounted twisted through 180°. In the embodiment shown in FIGS. 1 and 2, the upper adapter part 2 is formed symmetrically, in such a way that the openings 18 for passing the connection devices 16 through could also be omitted on one side or at one end. Instead, the upper adapter part may be provided rotated through 180° on the lower adapter part if the openings for passing the connection devices through are needed at this end or on this side.

FIG. 3 is a plan view of the lower adapter part 8 or housing 7 of the busbar adapter 1 of FIGS. 1 and 2. Two long bars 9 are arranged in the housing 7 for each of the three phases L1, L2 and L3. These long connection bars 9 extend substantially over the entire length of the housing 7. Further, the connection bars 9 comprise a fastening option, for example a thread 22, to which the connection device can be fastened, on each of the two ends thereof.

As disclosed previously with reference to FIGS. 1 and 2, the housing 7 comprises a base 10 having recesses 23 for receiving or installing the connection bars 9. As is shown in FIG. 3, the recesses 23 comprise webs 24 as support faces for the connection bars 9.

In the embodiment shown in FIG. 3, for example two connection bars 9 per phase L1, L2 and L3 are arranged mutually parallel in the housing 7 on the webs 24 as parallel bars and are contacted by two contact clamps 11. A fitting of two connection bars 9 in each case for each phase L1, L2 and L3 may be used for example at nominal currents of >800 A. The respective pairs of contact clamps 11 of the connection bars 9 are for example arranged mutually offset, as is shown in FIG. 3. The contact clamps 11 each comprise for example a screw 14 having an internal hexagon, which screw can be actuated by the user from the outside through a corresponding opening in the upper adapter part without risk of contact, to provide or release electrical contact between the connection bar 9 and an associated busbar.

Figure 4:
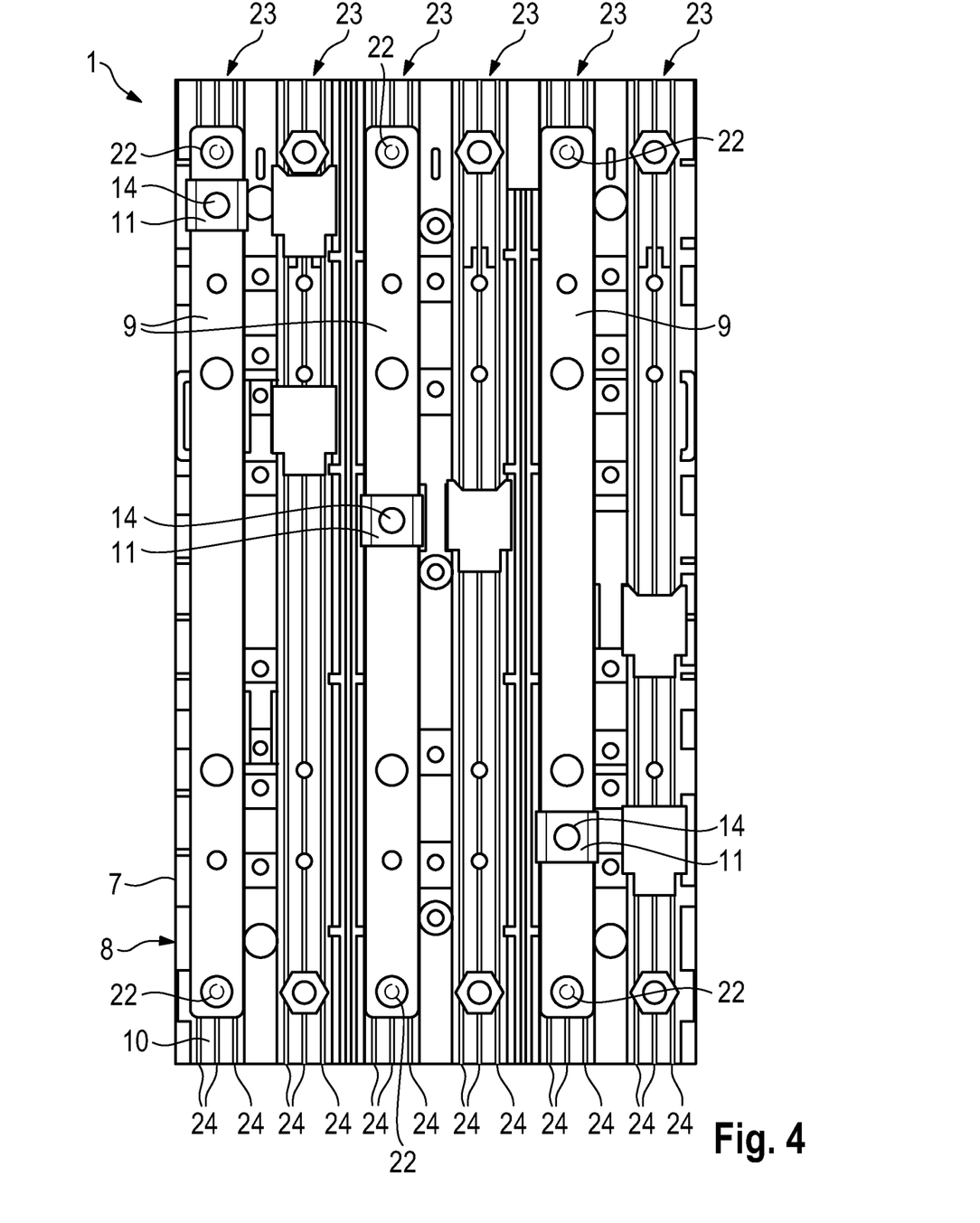
FIG. 4 is a plan view of the housing of the busbar adapter of FIGS. 1 and 2, long bars being arranged singly in the housing in each case.

FIG. 4 is a plan view of the housing 7 of the busbar adapter 1 of FIGS. 1 and 2. The embodiment of FIG. 4 merely differs from the embodiment of FIG. 3 in that only one long connection bar 9 is arranged in the housing 7 for each phase L1, L2 and L3. This arrangement can for example be selected at nominal currents of <800 A. Only one fitting of one connection bar 9 per phase is installed in each case. Accordingly, in this case too only three contact clamps 11 are required for electrically contacting the three connection bars 9, instead of six.

Further, FIG. 5 is a plan view of the housing 7 of the busbar adapter 1 of FIGS. 1 and 2, two short, two medium-length and two long connection bars 9 being arranged doubly in the housing 7 in each case. The short connection bars 9 extend for example merely over substantially a third of the length of the housing 7, and the medium-length connection bars 9 over substantially two thirds of the length of the housing 7. Further, the short and medium connection bars 9 for example only have a fastening option, for example a thread 22, for fastening the connection device at one end. The fitting consisting of two connection bars 9 for each phase L1, L2 and L3 is electrically contacted via two contact clamps 11 in each case.

Figure 6:
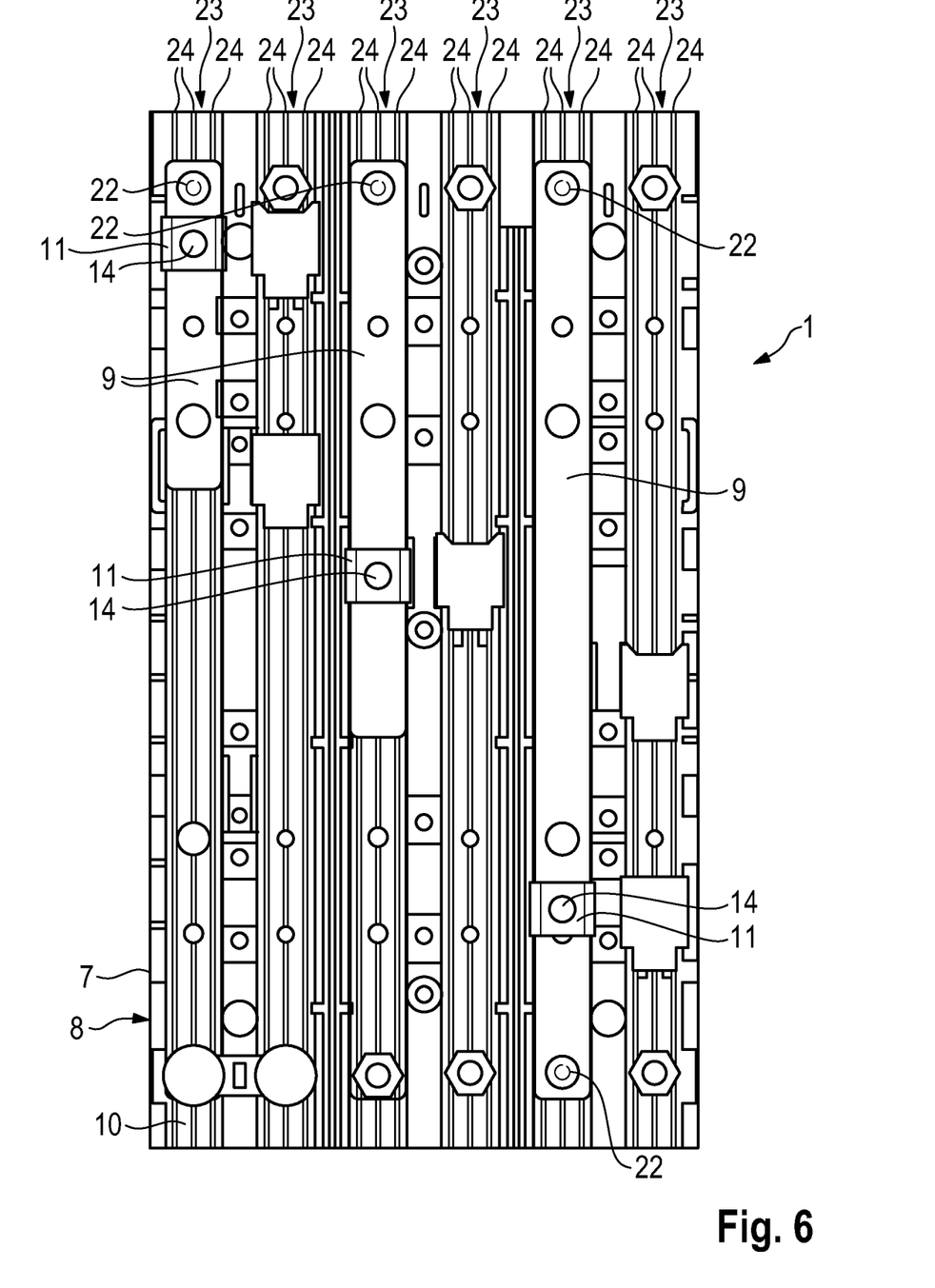
FIG. 6 is a plan view of the housing of the busbar adapter of FIGS. 1 and 2, short bars being arranged singly in the housing in each case.

Instead of for example two connection bars 9 for each phase L1, L2 and L3 as in FIG. 5, it is also possible for only one short, one medium-length and one long connection bar 9 per phase to be arranged in the housing 7, as is shown in FIG. 6 in the plan view of the housing 7 of the busbar adapter 1.

As in the example of FIG. 5, the short and medium-length connection bars 9 still only have a fastening option, for example a thread 22, for fastening the connection device at one end in the embodiment of FIG. 6. Further, one contact clamp 11 per connection bar 9 is provided for electrical contact.

Figure 7:
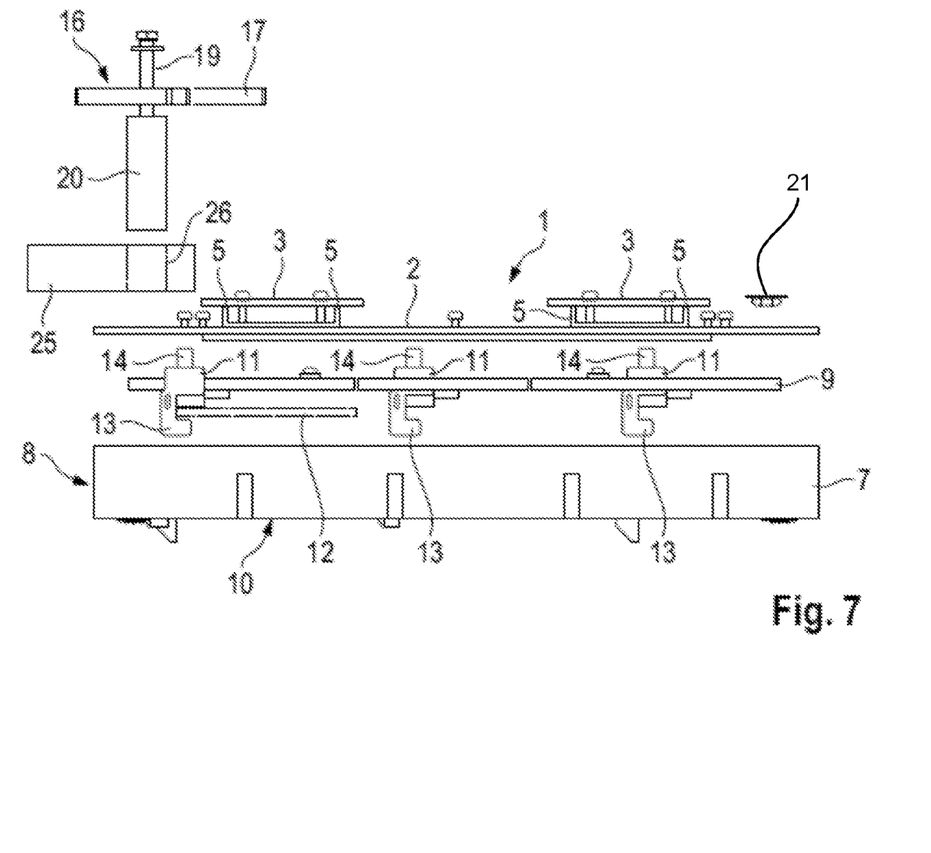
FIG. 7 is a further exploded view of the busbar adapter of FIG. 1, an additional connecting piece being provided.

FIG. 7 is a further exploded view of the busbar adapter 1 of FIGS. 1 and 2. The embodiment shown in FIG. 7 of the busbar adapter 1 merely differs from the busbar adapter 1 of FIGS. 1 and 2 and the associated FIG. 3 to 6 in that an additional connecting piece 25 is provided, to which for example a current transformer can be connected. To avoid unnecessary repetition, reference is therefore made to the description of FIG. 1 to 6.

As can be seen from FIG. 7, the connecting piece 25 is provided between the connection plate 17 of the connection device 16 and the upper adapter part 2. The connecting piece 25 comprises an opening 26, for passing the connection tube 20 of the connection device 16 and the screw element 19 guided in the connection tube 20 through. Further, the connecting piece 25 is provided with at least one terminal 27 for an electrical device, for example a transformer such as a current transformer etc.

Depending on the connecting piece 25, further electrical devices such as transformers for current measurement or current transformers etc. can optionally additionally be positioned during assembly, before the connection device 16 is mounted. No additional space is required for mounting the transformer. The space requirements are already met in the standard version.

Figure 8:
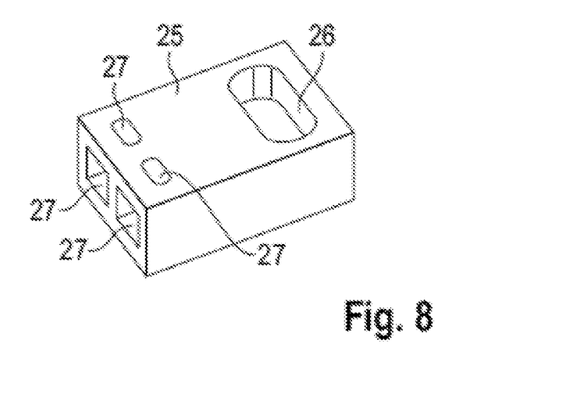
FIG. 8 is a perspective view of the connecting piece of FIG. 7.

FIG. 8 is a perspective view of the connecting piece 25 of FIG. 7. The connecting piece 25 comprises an opening 26 for passing at least one connection tube of a connection device through. Further, the connecting piece 25 comprises for example two terminals 27 for electrical devices such as transformers etc.

Figure 9:
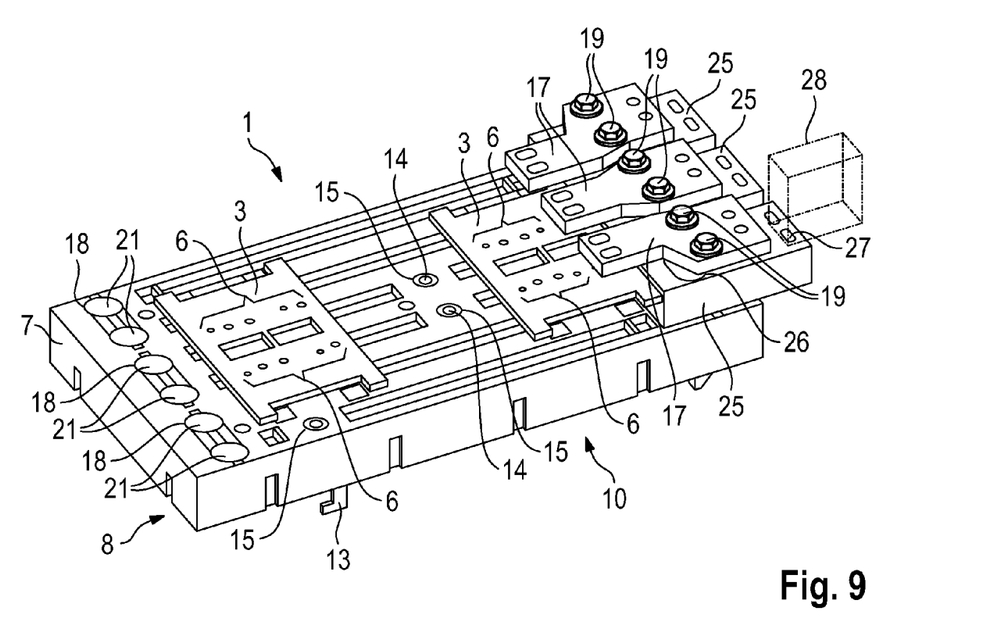
FIG. 9 is a perspective view of the busbar adapter of FIG. 7, along with the additional connecting piece.

FIG. 9 is a perspective view of the busbar adapter 1 of FIG. 7. A connecting piece 16 combines the current of two connection bars 9 of a phase L1, L2 or L3. The additional connecting piece 25 is provided between the connection plate 17 of the connection device 16 and the upper adapter part 2. The additional connecting piece comprises an opening 26 for passing the two connection tubes 20 of the connection device 16 through. Further, an electrical device 28, for example a transformer, is connected to one of the two terminals 27 of the tube connection device 25, as is indicated by a dot-dash line in FIG. 9.

Figure 10:
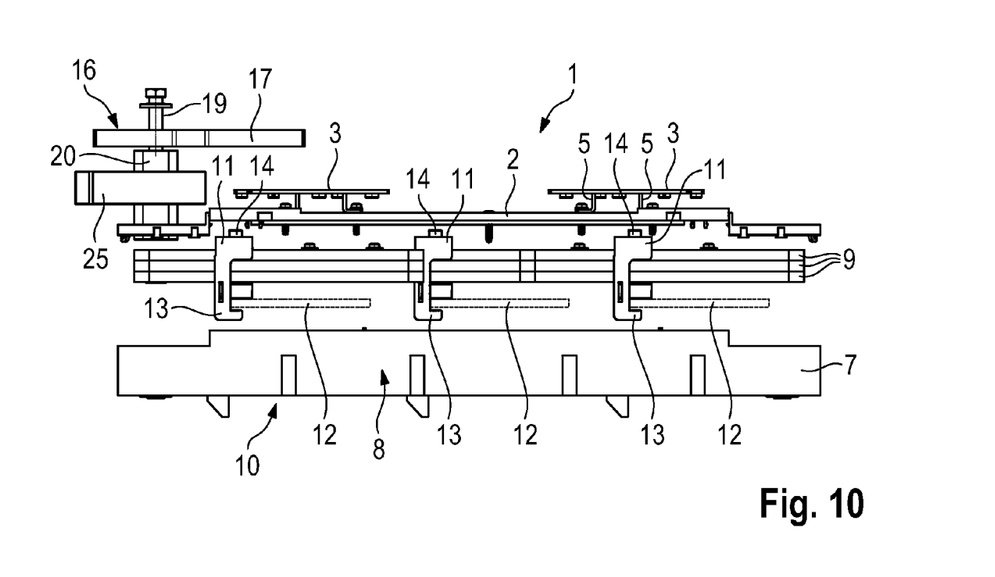
FIG. 10 is an exploded view of a busbar adapter in accordance with a further embodiment of the invention.
Figure 11:
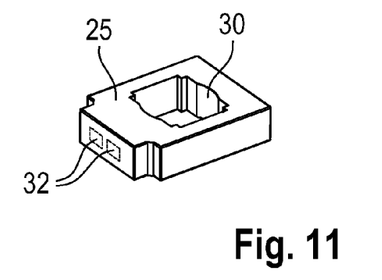
FIG. 11 is a perspective view of a connecting piece for a current transformer in accordance with FIG. 10.
Figure 12:
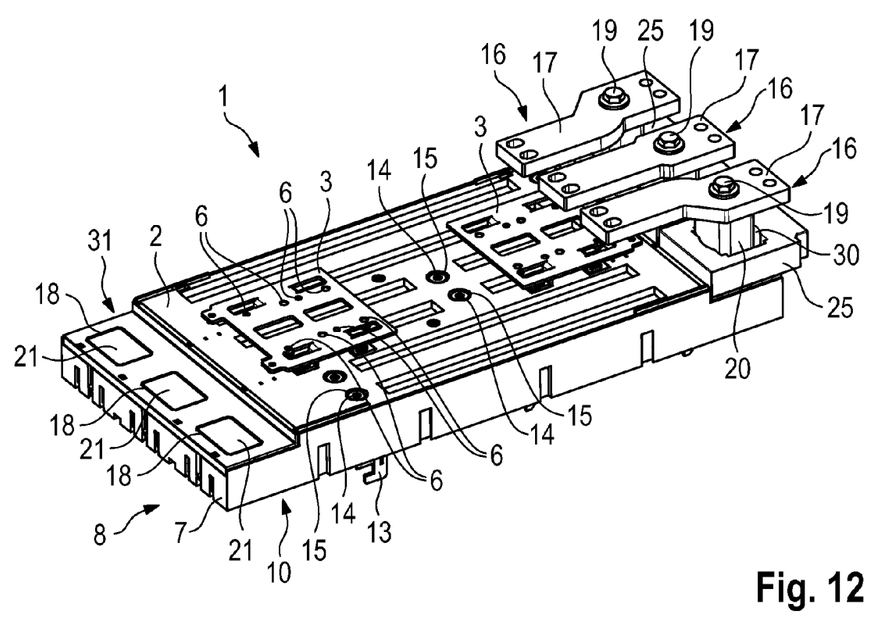
FIG. 12 is a perspective view of the busbar adapter of FIG. 10, along with the connecting pieces thereof for current transformers.
Figure 13:
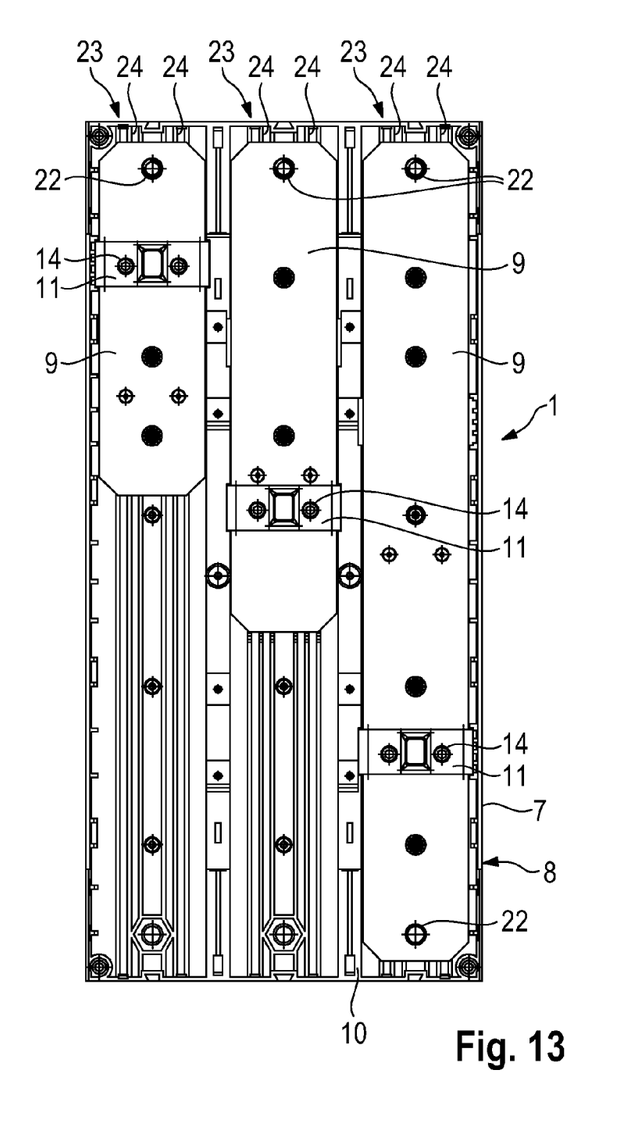
FIG. 13 is a plan view of the housing of the busbar adapter of FIGS. 10 and 12.

FIG. 10 is an exploded view of a busbar adapter in accordance with a further embodiment of the invention. FIG. 11 is a perspective view of a connecting piece 25 for connecting for example a current transformer as used in the busbar adapter 1 of FIG. 10. Further, FIG. 12 is a perspective view of the assembled busbar adapter 1 and FIG. 13 is a plan view of the housing of the busbar adapter. Moreover, FIG. 14 is a side view of the bar packets of FIGS. 10 and 13.

Figure 14:
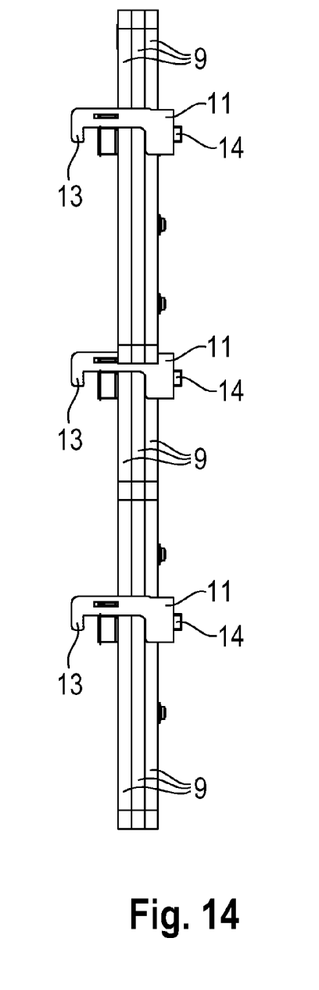
FIG. 14 is a side view of the bar packet of FIG. 10 and FIG. 13.
Figure 15:
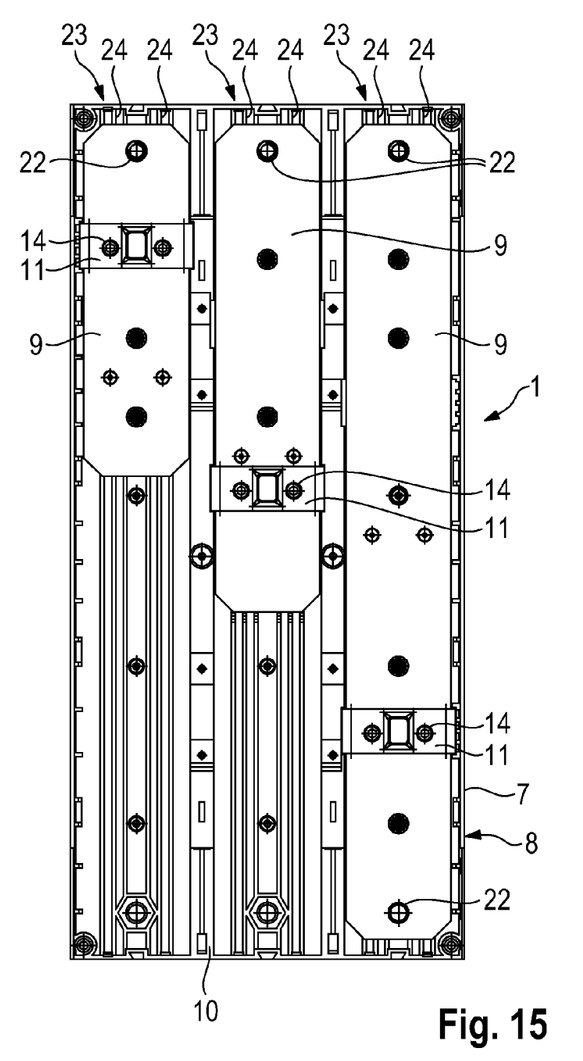
FIG. 15 is a plan view of the housing of the busbar adapter of FIGS. 10 and 12, each bar packet comprising two bars arranged on top of one another in the embodiment shown.
Figure 16:
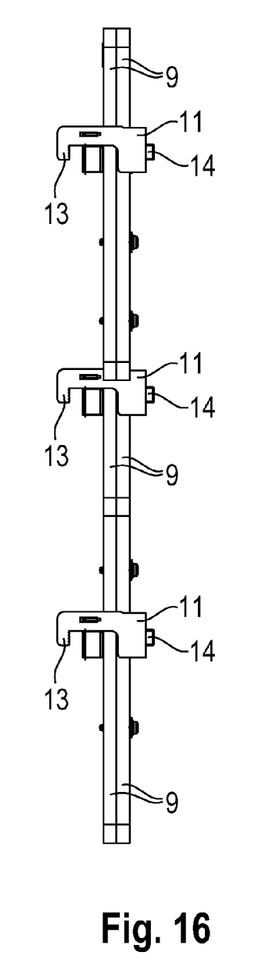
FIG. 16 is a side view of the bar packet of FIG. 15.

This embodiment, as shown by way of example in FIG. 10-14 and the following FIGS. 15 and 16, is of substantially the same construction as the embodiment previously disclosed with reference to FIG. 1-9 and the examples thereof.

The embodiment of the busbar adapter of FIG. 10-16 merely differs from the embodiment as shown in FIG. 1-9 in that, instead of two connection bars arranged side by side or mutually parallel for each phase, one connection bar 9 per phase is provided. As is shown in FIG. 10, 13 and FIG. 14 and the following FIGS. 15 and 16, one in particular wide bar 9 is provided for each phase instead of two in particular narrow bars.

Optionally, in addition to the respective connection bar 9, at least one, as in the following FIG. 16, or two additional connection bars may be laid and clamped in place, as is shown in FIGS. 10 and 14.

In the embodiment shown in FIG. 10-16, the busbar adapter 1 is for example in the form of a three-phase busbar adapter. According to the invention, the busbar adapter 1 may also have one or two or more than three phases. The busbar adapter 1 comprises an upper adapter part 2 on which holding plates 3 are fastened.

So as to fasten electrical devices, in particular switching devices 4, the respective holding plate 3 comprises a fastening hole pattern 6 for one or more switching devices, as is shown in FIG. 12. The busbar adapter 1 further comprises a housing 7 as the lower adapter part 8, in which planar or plate-shaped connection bars or busbars 9 can be received, as is shown in FIGS. 10, 12, 13 and 15.

The lower adapter part 8 or housing 7 is configured in such a way that, at different nominal currents, flexible equipping with connection bars 9 is possible. For each of the three phases L1, L2 and L3 of the three-phase busbar adapter, a connection bar or at least two connection bars arranged on top of one another can be inserted into the housing.

Thus for example at nominal currents lower than 800 A only one fitting of one connection bar per phase is used for each phase. Therefore, there are also only three contact clamps required for electrically contacting the total of three connection bars in this case.

At nominal currents of over 800 A, in each case at least two connection bars 9 arranged on top of one another are installed in the associated recesses of the housing 7 for each phase L1, L2 and L3 and contacted with a contact clamp, as is shown in the following FIGS. 15 and 16. Accordingly, in this case too, only three contact clamps are used for electrically contacting the total of six connection bars 9.

In FIGS. 10 and 12-14, at a nominal current of up to 1600 A or higher for example three connection bars 9 arranged on top of one another are installed in the associated recesses of the housing 7 for each phase L1, L2 and L3 and contacted using a contact clamp. Thus, likewise only three contact clamps are required for electrically contacting the total of nine connection bars.

The busbar adapter 1 is subsequently placed on associated busbars 12. As is indicated by a dashed line in the embodiment of FIG. 10, the busbars 12 are introduced into corresponding contact recesses 13 in the contact clamps 11 and clamped in place on the associated connection bars 9 and electrically contacted. For this purpose, in the embodiment shown in FIG. 12 the respective contact clamp 11 comprises a screw 14 having an internal hexagon, and is accessible by a user from the outside through an associated opening 15 in the upper adapter part 2.

Using connection devices 16, the currents of the connection bars 9 are passed to a respective switching device 4, which is fastened to the holding plates. The connection device 16 comprises a connection plate 17 for connecting the three connection bars 9 arranged on top of one another for each phase L1, L2, L3 to a switching device 4.

For the connection devices 16, openings 18 are provided in the upper adapter part 2 for connection to the respective pack of one connection bar or at least two connection bars 9 arranged on top of one another. The openings 18 are arranged above for example one or both ends, as shown in FIGS. 10 and 12, of the connection bars 9 received in the lower adapter part 8 or housing 7, in such a way that the connection bars 9 can be connected, at least one or preferably both ends thereof, to the associated connection device 16.

In each case, the connection device 16 comprises the connection plate 17 for connection to a switching device 4 fastened on the holding plate 3. Further, a screw element 19 is fastened to the connection plate 17. The screw element 19 is guided in a connection tube 20, and is fastened to the associated pack of one connection bar or at least two connection bars 9 arranged on top of one another. For this purpose, the connection tube 20 is passed together with the screw element 19 through the opening 18 in the upper adapter part 2, and the screw element 19 is screwed to the connection bar 9.

The openings 18 on the side of the upper adapter part 2 which are not required, or into which no connection tubes 20 having screw elements 19 are inserted, are sealed for example using covers 21 for the connection tubes 20 or on one side using a removable stamp (not shown) in the tool.

In the embodiment shown in FIG. 10-14, a connecting piece 25 is optionally provided for an additional transformer for example, in particular a current transformer, and is provided between the connection plate 17 of the connection device 16 and the upper adapter part 2. The connecting piece 25 comprises an opening 30, for passing the connection tube 20 of the connection device 16 and the screw element 19 guided in the connection tube 20 through. The connection tube 20 may be of a cylindrical shape (not shown), or else for example of an angular shape as is shown in FIGS. 10 and 12 and can be inserted into the opening 30 which is for example of a corresponding angular shape. Thus, no additional space is required for assembling the transformer. The space requirements are already met in the standard version. The connecting piece 25 further comprises at least one terminal 32 for an electrical connection.

Moreover, as is shown in FIGS. 10 and 12, the lower adapter part 8 may optionally additionally be provided with a recess 31, for example in the form of a depression or step, for the connecting piece 25, in such a way that a particularly compact construction can be achieved.

FIG. 15 is a plan view of the housing of the busbar adapter of FIGS. 10 and 12, in this case three bar packets of different lengths, each consisting of merely two connection bars 9 arranged on top of one another, being arranged in the housing. Further, FIG. 16 is a side view of the bar packet of FIG. 15. As disclosed above, for example two connection bars arranged on top of one another may be used for each phase at nominal currents of more than 800 A.

Although the present invention was described in the above by way of the preferred embodiments, it is not limited thereto, but can be modified in many different ways. In particular, the above-disclosed embodiments and examples, in particular individual features thereof, can be combined with one another.

The busbar adapter disclosed herein may for example be in the form of a 185 mm busbar adapter for currents of for example up to 1600 A. However, the invention is not limited to this embodiment.

LIST OF REFERENCE NUMERALS 1 busbar adapter
2 upper adapter part
3 holding plate
4 switching device
5 spacer portion
6 fastening hole pattern
7 housing
8 lower adapter part
9 connection bar
10 base
11 contact clamp
12 busbar
13 contact recess
14 screw
15 opening
16 connection device
17 connection plate
18 opening for connection device
19 screw element
20 connection tube
21 cover
22 thread
23 recess
24 web
25 connecting piece
26 opening
27 terminal
28 electrical device
30 opening
31 recess
32 terminal

The invention claimed is:

1. A Busbar adapter comprising a lower adapter part, which comprises a base having recesses for receiving connection bars which can be electrically contacted with busbars to pass electrical current, wherein the number of connection bars per phase which can be received in the recesses of the lower adapter part is variable, and the connection bars are electrically connectable to at least one electrical device, which can be fastened to the upper adapter part of the busbar adapter, wherein at least one connection bar per phase is provided, at least one connection bar of a phase being connectable to at least one additional connection bar, the connection bars being stacked on top of one another.

2. The Busbar adapter according to claim 1, wherein at least two connection bars per phase are provided, the at least two connection bars being arranged side by side and in particular mutually parallel.

3. The Busbar adapter according to claim 1, wherein the busbar adapter comprises at least one connection device, which is formed so as to combine the currents of a plurality of connection bars for each phase.

4. The Busbar adapter according to claim 3, wherein the connection device comprises a connection plate, at least one connection tube and a screw element guided in the connection tube, the at least one screw element being connectable to a connection bar at one end and to the connection plate at the other end, the connection plate being connectable to at least one electrical device, in particular a switching device.

5. The Busbar adapter according to claim 4, wherein the upper adapter part comprises at least one opening and preferably a plurality of openings for passing the connection device through and for connecting the connection device to an associated connection bar.

6. The Busbar adapter according to claim 5, wherein the openings are formed to be coverable using a respective cover, the cover being in the form of a lid or a pierceable cover or the openings being sealable using at least one tool die.

7. The Busbar adapter according to claim 3, wherein the upper adapter part is formed symmetrically and one end of the upper adapter part is formed with the openings for passing the connection device through.

8. The Busbar adapter according to claim 1, wherein at least one recess of the lower adapter part comprises webs as a support face for a connection bar received in the recess, the base being closed between the webs or openings for air circulation being provided between the webs.

9. The Busbar adapter according to claim 1, wherein the busbar adapter comprises at least one holding plate having at least one hole pattern for fastening the at least one electrical device, in particular switching device.

10. The Busbar adapter according to claim 1, wherein the busbar adapter comprises a contact clamp for sliding the busbar adapter onto a busbar and for electrically contacting a connection bar with the busbar.

11. The Busbar adapter according to claim 10, wherein the contact clamp preferably comprises a screw having an internal hexagon for clamping the connection bar to the busbar received in the contact clamp, it being possible to actuate the screw from the outside through an opening in the upper adapter part without risk of contact.

12. The Busbar adapter according to claim 2, wherein the busbar adapter comprises at least one connecting piece, the connecting piece comprising an opening for passing at least one connection tube of the connection device through, and the connecting piece comprising at least one terminal for an electrical device, in particular a transformer, preferably a current transformer.

13. The Busbar adapter according to claim 1, wherein the recesses of the lower adapter part are formed so as to receive connection bars of the same and/or different lengths, the connection bars of a phase or of different phases being of the same or a different length, and at least one connection bar of at least one phase being contactable at one or both ends by a connection device.

14. A System comprising the busbars and the busbar adapter according to claim 1, wherein at least one connection bar per phase is received in the recesses of the busbar adapter, the connection bars being of the same or different lengths, the connection bar of at least one phase being contactable at one or both ends by a connection device, and connection bars preferably being planar or plate-shaped connection bars, in particular consisting of copper.

15. A Busbar adapter comprising a lower adapter part, which comprises a base having recesses for receiving connection bars which can be electrically contacted with busbars to pass electrical current, wherein the number of connection bars per phase which can be received in the recesses of the lower adapter part is variable, and the connection bars are electrically connectable to at least one electrical device, which can be fastened to the upper adapter part of the busbar adapter, wherein the busbar adapter comprises at least one connection device, wherein the connection device comprises a connection plate, at least one connection tube and a screw element guided in the connection tube, the at least one screw element being connectable to a connection bar at one end and to the connection plate at the other end, the connection plate being connectable to at least one electrical device.

16. The Busbar adapter according to claim 15, wherein the at least one electrical device is a switching device.

17. A System comprising busbars and the busbar adapter according to claim 15, wherein at least one connection bar per phase is received in the recesses of the busbar adapter, the connection bars being of the same or different lengths, the connection bar of at least one phase being contactable at one or both ends by a connection device, and connection bars preferably being planar or plate-shaped connection bars, in particular consisting of copper.

18. A System comprising busbars and the busbar adapter according to claim 16, wherein at least one connection bar per phase is received in the recesses of the busbar adapter, the connection bars being of the same or different lengths, the connection bar of at least one phase being contactable at one or both ends by a connection device, and connection bars preferably being planar or plate-shaped connection bars, in particular consisting of copper.

* * * * *